(12) United States Patent
Mo et al.

(10) Patent No.: US 10,295,737 B2
(45) Date of Patent: May 21, 2019

(54) BENDING-INSENSITIVE, RADIATION-RESISTANT SINGLE-MODE OPTICAL FIBER

(71) Applicant: FIBERHOME TELECOMMUNICATION TECHNOLOGIES CO., LTD, Wuhan (CN)

(72) Inventors: Qi Mo, Wuhan (CN); Lijie Huang, Wuhan (CN); Huang Yu, Wuhan (CN); Cheng Liu, Wuhan (CN); Wen Chen, Wuhan (CN); Zhiqiang Yu, Wuhan (CN); Dongxiang Wang, Wuhan (CN); Bingfeng Cai, Wuhan (CN); Liming Chen, Wuhan (CN); Huiping Shi, Wuhan (CN)

(73) Assignee: FIBERHOME TELECOMMUNICATION TECHNOLOGIES CO., LTD, Wuhan (CN)

( * ) Notice: Subject to any disclaimer, the term of this patent is extended or adjusted under 35 U.S.C. 154(b) by 0 days.

(21) Appl. No.: 15/766,837

(22) PCT Filed: Oct. 21, 2016

(86) PCT No.: PCT/CN2016/102822
§ 371 (c)(1),
(2) Date: Apr. 9, 2018

(87) PCT Pub. No.: WO2017/173808
PCT Pub. Date: Oct. 12, 2017

(65) Prior Publication Data
US 2018/0299615 A1 Oct. 18, 2018

(30) Foreign Application Priority Data
Apr. 6, 2016 (CN) .......................... 2016 1 0209017

(51) Int. Cl.
*G02B 6/036* (2006.01)
*G02B 6/02* (2006.01)
*G02B 1/04* (2006.01)

(52) U.S. Cl.
CPC .......... *G02B 6/0365* (2013.01); *G02B 1/046* (2013.01); *G02B 1/048* (2013.01); *G02B 6/02395* (2013.01); *G02B 6/036* (2013.01)

(58) Field of Classification Search
CPC .................................................. G02B 6/0365
See application file for complete search history.

(56) References Cited

U.S. PATENT DOCUMENTS

| 7,680,381 B1* | 3/2010 | Bookbinder ....... G02B 6/03638 385/126 |
| 9,405,062 B2* | 8/2016 | Krabshuis ............ G02B 6/0281 |
| 2007/0274666 A1 | 11/2007 | Aikawa et al. |

FOREIGN PATENT DOCUMENTS

| CN | 101598834 A | 12/2009 |
| CN | 102147496 A | 8/2011 |

(Continued)

OTHER PUBLICATIONS

Jochen Kuhnhenn, Stefan Klaus and Udo Weinand, Quality Assurance for Irradiation Tests of Optical Fibers: Uncertainty and Reproducibility, IEEE Transactions on Nuclear Science, vol. 56, No. 4, Aug. 2009, at 2160-2166.

*Primary Examiner* — Omar R Rojas
(74) *Attorney, Agent, or Firm* — Gokalp Bayramoglu

(57) ABSTRACT

The present invention relates to the field of single-mode optical fibers and discloses a bending-insensitive, radiation-resistant single-mode optical fiber, sequentially including from inside to outside: a core, inner claddings, and an outer cladding, all made from a quartz material. The inner claddings comprise, from inside to outside, a first fluorine-doped inner cladding and a second fluorine-doped inner cladding.

(Continued)

The core and the first fluorine-doped inner cladding are not doped with germanium. The respective concentrations of other metal impurities and phosphorus are less than 0.1 ppm. By mass percent, the core has a fluorine dopant content of 0-0.45% and a chlorine content of 0.01-0.10%; the first fluorine-doped inner cladding has a fluorine concentration of 1.00-1.55%; and the second fluorine-doped inner cladding has a fluorine concentration of 3.03-5.00%.

14 Claims, 2 Drawing Sheets

(56) References Cited

FOREIGN PATENT DOCUMENTS

| | | |
|---|---|---|
| CN | 103543491 A | 1/2014 |
| CN | 105182471 A | 12/2015 |
| CN | 105676349 A | 6/2016 |

* cited by examiner

BENDING-INSENSITIVE, RADIATION-RESISTANT SINGLE-MODE OPTICAL FIBER

CROSS REFERENCE TO RELATED APPLICATIONS

This application is the national phase entry of International Application PCT/CN 2016/102822, filed on Oct. 21, 2016 which is based upon and claims priority to Chinese Patent Application No. 201610209017.7, filed on Apr. 6, 2016, the entire contents of which are incorporated herein by reference.

TECHNICAL FIELD

The present invention relates to the technical field of single-mode optical fibers, in particular to a bending-insensitive, radiation-resistant single-mode optical fiber.

BACKGROUND

In recent years, optical fibers are more and more widely used for data transmission and optical fiber sensing in the aerospace field and the nuclear powder field: however, a large amount of ionizing radiation exists in these environments and can greatly increase additional losses of optical fibers and shorten the service life of the optical fibers. Therefore, radiation-resistant optical fibers need to be adopted in the aerospace field and the nuclear powder field.

Existing radiation-resistant optical fibers are mainly of three types, namely, multi-mode optical fibers with the core diameter of 50 μm, multi-mode optical fibers with the core diameter of 62.5 μm, and single-mode optical fibers. As the waveguide structures of existing radiation-resistant single-mode optical fibers do not have an anti-bending ability, the existing radiation-resistant single-mode optical fibers cannot be used under extremely small bending radius conditions such as small optical devices. Therefore the existing radiation-resistant single-mode optical fibers are severely restrained in actual application, and the development tendency of radiation-resistant single-mode optical fibers is to improve the bending resistance of the radiation-resistant optical fibers

SUMMARY

To overcome the defects of the prior art, the present invention provides a bending-insensitive, radiation-resistant single-mode optical fiber. Compared with radiation-resistant single-mode optical fibers provided in the prior art, the single-mode optical fiber dramatically reduces additional losses when bent, exhibits a stronger anti-bending ability and is therefore bend insensitive, and has higher resistance against radiation.

The bending-insensitive, radiation-resistant single-mode optical fiber provided by the present invention sequentially comprises, from inside to outside, a core, inner claddings and an outer cladding which are all made from a quartz material, wherein the inner claddings comprise from inside to outside, a first fluorine-doped inner cladding and a second fluorine-doped inner cladding, the core and the first fluorine-doped inner cladding are not doped with germanium, and respective concentrations of other metal impurities and phosphorus are less than 0.1 ppm; by mass percent, the core has a fluorine dopant content of 0-0.45% and a chlorine content of 0.01-0.10%; the first fluorine-doped inner cladding has a fluorine concentration of 1.00-1.55%; and the second fluorine-doped inner cladding has a fluorine concentration of 3.03-5.00%.

Based on the above technical scheme, the maximum relative refractive index difference $\Delta 1_{max}$ between the core and the first fluorine-doped inner cladding is 0.13%-0.30%; the maximum relative refractive index difference $\Delta 2_{max}$ between the first fluorine-doped inner cladding and the second fluorine-doped inner cladding is 0.40%-0.96%, and the refractive index of the second fluorine-doped inner cladding is smaller than that of the first fluorine-doped inner cladding; and the maximum relative refractive index difference $\Delta 3_{max}$ between the second fluorine-doped inner cladding and the outer cladding is −0.28%−−1.09%.

Based on the above technical scheme, the maximum relative refractive index difference $\Delta 1_{max}$ between the core and the first fluorine-doped inner cladding is 0.30%, the maximum relative refractive index difference $\Delta 2_{max}$ between the first fluorine-doped inner cladding and the second fluorine-doped inner cladding is −0.61%, and the maximum relative refractive index difference $\Delta 3_{max}$ between the second fluorine-doped inner cladding and the outer cladding is −0.91%.

Based on the above technical scheme, the single-mode optical fiber has an attenuation coefficient of 0.322 dB/km at the wavelength of 1310 nm, an attenuation coefficient of 0.185 dB/km at the wavelength of 1550 nm and an attenuation coefficient of 0.186 dB/km at the wavelength of 1625 nm.

Based on the above technical scheme, the single-mode optical fiber has a bending loss of 0.11 dB at the wavelength of 1550 nm and a bending loss of 0.21 dB at the wavelength of 1625 nm when wound by one circle under the bending diameter of 10 mm.

Based on the above technical scheme, the radius R1 of the core is 3.9-4.3 μm, the radius R2 of the first fluorine-doped inner cladding is 5-34 μm, and the radius R3 of the second fluorine-doped inner cladding is 22-48 μm.

Based on the above technical scheme, the radius R1 of the core is 4 μm, the radius R2 of the first fluorine-doped inner cladding is 30 μm, and the radius R3 of the second fluorine-doped inner cladding is 46 μm.

Based on the above technical scheme, under the gamma radiation dose of 2000 kGy, the single-mode optical fiber has a radiation additional loss below 14.8 dB/km at the wavelength of 1310 nm.

Based on the above technical scheme, the single-mode optical fiber is clad with an optical fiber coating prepared from one or two of high-temperature resistant acrylic resin, silicone rubber, polyimide, carbon and metal.

Compared with the prior art, the present invention has the following advantages:

(1) The fluorine-doped double-cladding structure with a lower refractive index is arranged around the core of the optical fiber of the present invention so that the power distribution and the restraint ability of an optical wave electromagnetic field can be adjusted and high-order power can be rapidly released through refractive index channels of the fluorine-doped double-cladding structure, and thus the optical fiber dramatically reduces additional losses when bent, exhibits a stronger anti-bending ability and is therefore bend insensitive, and application environments of the optical fiber can be widened.

(2) Before radiation rays reach the core through the fluorine-doped double-cladding structure of the present invention, part of the radiation can be absorbed by the fluorine-doped double-cladding structure, and thus structural defects, caused by radiation, of the core are reduced, and the radiation resistance of the optical fiber is improved.

(3) The cores of existing optical fibers are doped with germanium, Rayleigh scattering losses of core materials can be caused by germanium, and consequentially, the attenuation coefficient of the optical fiber is high; and the core of the present invention is not doped with germanium, so that Rayleigh scattering losses are dramatically reduced, it is ensured that the optical fiber has a low attenuation coefficient at the window with the wavelength of 1310 nm, attenuation of the optical fiber is reduced, and transmission losses are low. Meanwhile, as the core is not doped with germanium, the sensibility of the optical fiber to radiation can be reduced. According to the present invention, the content of other metal impurities and the content of phosphorus in the core and the claddings are controlled, a certain amount of fluorine is doped in the optical fiber in proportion, and thus radiation damage to the optical fiber is further reduced.

Marks of the Reference Signs: 1—core, 2—first fluorine-doped inner cladding, 3—second fluorine-doped inner cladding, 4—outer cladding

DETAILED DESCRIPTION

A further detailed description of the present invention is given with the accompanying drawings and specific embodiment as follows.

Figure 1:
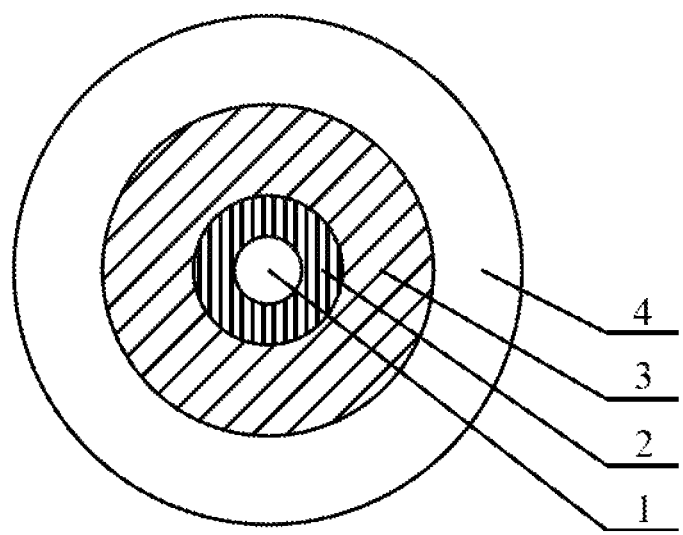
FIG. 1 is a top view of a bending-insensitive, radiation-resistant single-mode optical fiber in the embodiment of the present invention.

As is shown in FIG. 1, the embodiment of the present invention provides a bending-insensitive, radiation-resistant single-mode optical fiber. The bending-insensitive, radiation-resistant single-mode optical fiber sequentially comprises, from inside to outside, a core 1, inner claddings and an outer cladding 4 which are all made from a quartz material, wherein the inner claddings comprise, from inside to outside, a first fluorine-doped inner cladding 2 and a second fluorine-doped inner cladding 3, the core 1 and the first fluorine-doped inner cladding 2 are not doped with germanium (instrumental analysis shows that the germanium concentration is less than 1 ppm), and respective concentrations of other metal impurities and phosphorus are less than 0.1 ppm; by mass percent, the core 1 has a fluorine dopant content of 0-0.45% and a chlorine content of 0.01-0.10%: the first fluorine-doped inner cladding 2 has a fluorine concentration of 1.00-1.55%; and the second fluorine-doped inner cladding 3 has a fluorine concentration of 3.03-5.00%.

As is shown in FIG. 1, the core 1 is located at the center of the cross section of the optical fiber and is the main light guiding region of the optical fiber: the core 1 is sequentially clad with the first fluorine-doped inner cladding 2 and the second fluorine-doped inner cladding 3, and the first fluorine-doped inner cladding 2 and the second fluorine-doped inner cladding 3 are annular regions, doped with fluorine, on the cross section of the optical fiber; and the second fluorine-doped inner cladding 3 is clad with the outer cladding 4. The radius R1 of the core 1 is 3.9-4.3 µm, the radius R2 of the first fluorine-doped inner cladding 2 is 5-34 µm, the radius R3 of the second fluorine-doped inner cladding 3 is 22-48 µm, and the radius R4 of the outer cladding 4 is 60.5-64.5 µm.

Figure 2:
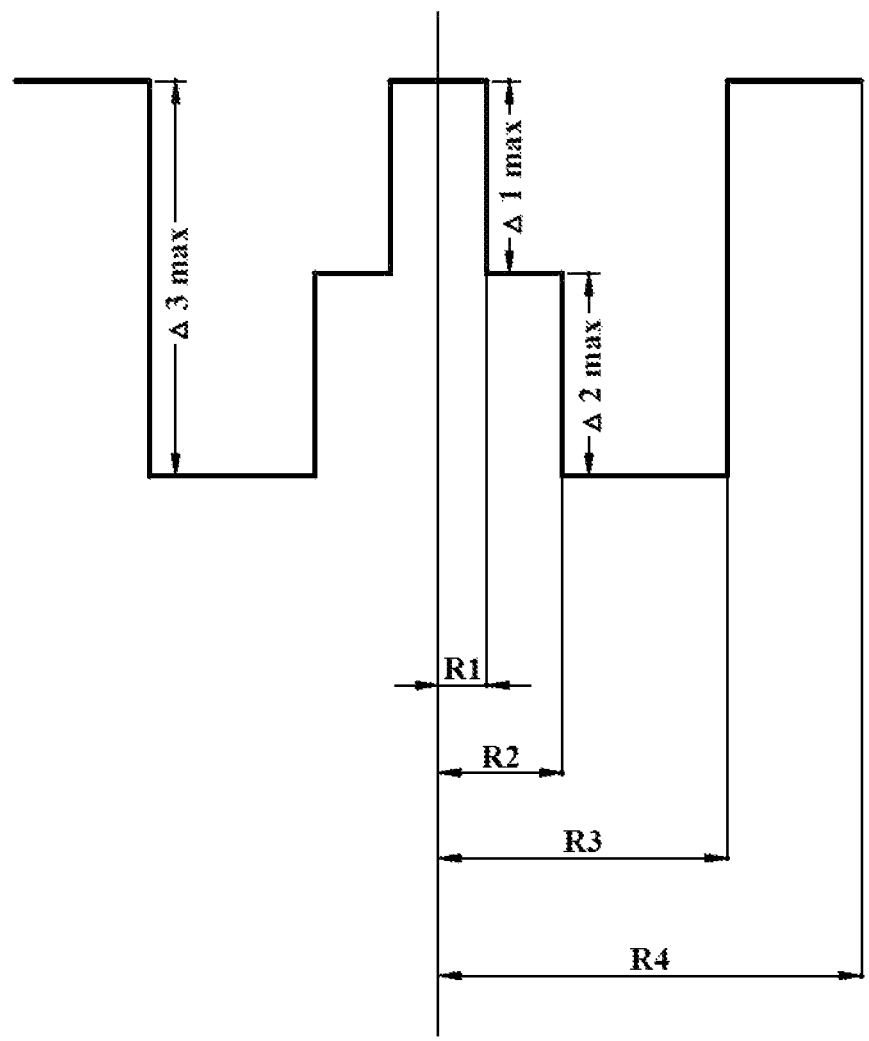
FIG. 2 is a sectional view of the bending-insensitive, radiation-resistant single-mode optical fiber in the embodiment of the present invention.

The maximum relative refractive index difference $\Delta 1_{max}$ between the core 1 and the first fluorine-doped inner cladding 2 is 0.13%-0.30%; the maximum relative refractive index difference $\Delta 2_{max}$ between the first fluorine-doped inner cladding 2 and the second fluorine-doped inner cladding 3 is 0.40%-0.96%, and as is shown in FIG. 2, the refractive index of the second fluorine-doped inner cladding 3 is smaller than that of the first fluorine-doped inner cladding 2; and the maximum relative refractive index difference $\Delta 3_{max}$ between the second fluorine-doped inner cladding 3 and the outer cladding 4 is -0.28%--1.09%.

The single-mode optical fiber is further clad with an optical fiber coating prepared from one or two of high-temperature resistant acrylic resin, silicone rubber, polyimide, carbon and metal. By adoption of different coating materials, the optical fiber can adapt to different environment temperatures. When the optical fiber coating is prepared from ultraviolet-cured silicone rubber or high-temperature resistant acrylic resin, the single side thickness of the coating is 60±5 µm, and the operating temperature of the single-mode optical fiber is -40-150° C. When the optical fiber coating is prepared from heat-cured silicone rubber, the single side thickness of the coating is 20±4 µm, and the operating temperature of the single-mode optical fiber is -50-150° C. When the optical fiber coating is prepared from heat-cured polyimide, the single side thickness of the coating is 15±31 µm, and the operating temperature of the single-mode optical fiber is -50-400° C. When the optical fiber coating is prepared from carbon the single side thickness of the coating is 15±3 µm, and the operating temperature of the single-mode optical fiber is -50-350° C. When the optical fiber coating is prepared from metal, the single side thickness of the coating is 15±3 µm, and the operating temperature of the single-mode optical fiber is -200-700° C.; and the metal is gold, silver, copper and aluminum or the alloy of any two of these metals.

A detailed description of the present invention is given with seven specific embodiments as follows.

According to the detection method adopted in the embodiments of the present invention, at the temperature of about 24° C., a cobalt-60 radiation source is used to irradiate the optical fiber with the dose rate of 0.45 Gy/s, and the total dose is 2000 kGy. During irradiation, the attenuation caused by radiation, of the optical fiber is measured through a light source with the wavelength of 1310 nm. More details about the plotting device and the testing process for the attenuation incremental data after radiation in Table 1 can be obtained from the following publication: Jochen Kuhnhenn. Stefan Klaus and Udo Weinand, Quality Assurance for Irradiation Tests of Optical Fibers: Uncertainty and Reproducibility, IEEE Transactions on Nuclear Science, Vol. 56, No. 4, August 2009, at 2160-2166.

The embodiments 1-7 and detection data are shown in Table 1.

TABLE 1

Embodiments 1-7 and detection data

| serial number | 1 | 2 | 3 | 4 | 5 | 6 | 7 |
|---|---|---|---|---|---|---|---|
| fluorine content of the core (wt %) | 0 | 0.2 | 0.2 | 0.2 | 0.2 | 0.3 | 0.45 |
| chlorine content of the core (wt %) | 0.01 | 0.01 | 0.01 | 0.03 | 0.01 | 0.1 | 0.05 |
| fluorine content of the first fluorine-doped inner cladding (wt %) | 1.17 | 1.37 | 1.37 | 1.37 | 1.37 | 1.55 | 1.00 |
| fluorine content of the second fluorine-doped inner cladding (wt %) | 4.08 | 3.03 | 3.45 | 3.45 | 3.45 | 4.09 | 5.00 |
| $\Delta 1_{max}$ (%) | 0.28 | 0.28 | 0.28 | 0.28 | 0.28 | 0.30 | 0.133 |
| $\Delta 2_{max}$ (%) | 0.7 | 0.4 | 0.5 | 0.5 | 0.5 | 0.61 | 0.96 |
| $\Delta 3_{max}$ (%) | −0.28 | −0.28 | −0.28 | −0.78 | −0.78 | −0.91 | −1.093 |
| R1 (μm) | 4 | 3.9 | 4 | 4 | 4 | 4 | 4.3 |
| R2 (μm) | 5 | 34 | 12 | 12 | 12 | 30 | 12 |
| R3 (μm) | 22 | 45 | 22 | 48 | 25 | 46 | 36 |
| R4 (μm) | 60.5 | 62.5 | 62.5 | 64.5 | 62.5 | 62.5 | 62.5 |
| attenuation coefficient at the wavelength of 1310 mm (dB/km) | 0.345 | 0.444 | 0.338 | 9.342 | 0.344 | 0.322 | 0.334 |
| attenuation coefficient at the wavelength of 1550 nm (dB/km) | 0.196 | 0.592 | 0.191 | 12.197 | 0.19 | 0.185 | 0.196 |
| attenuation coefficient at the wavelength of 1625 mn (dB/km) | 0.199 | 0.594 | 0.194 | 12.203 | 0.193 | 0.186 | 0.197 |
| coating materials | acrylic resin | polyimide | carbon/acrylic resin | copper | acrylic resin | silicone rubber/acrylic resin | acrylic resin |
| single side length of the coasting (μm) | 60 | 15 | 75 | 20 | 60 | 82 | 60 |
| radiation additional loss (dB/km) | 14.8 | 5.6 | 93 | 3.5 | 12.4 | 12.8 | 14.8 |
| additional loss at the wavelength of 1550 nm under the bending diameter of 10 mm (dB/circle) | 0.11 | 0.25 | 0.13 | 0.31 | 0.12 | 0.11 | 0.27 |
| additional loss at the wavelength of 1625 nm under the bending diameter of 10 mm (dB/circle) | 0.21 | 0.33 | 0.26 | 0.42 | 0.23 | 0.21 | 0.38 |

From Table 1, compared with conventional radiation-resistant single-mode optical fibers, the bending-insensitive, radiation-resistant single-mode optical fiber provided by the present invention dramatically reduces additional losses, the bending loss is also dramatically reduced, and by adoption of various coating materials, the optical fiber has good radiation resistance and high temperature resistance. Under the gamma radiation dose of 2000 kGy, the single-mode optical fiber has a radiation additional loss below 14.8 dB/km at the wavelength of 1310 nm. The single-mode optical fiber has the minimum bending loss of 0.08 dB at the wavelength of 1550 nm and the minimum bending loss of 0.25 dB at the wavelength of 1625 nm when wound by one circle under the bending diameter of 15 mm Wherein, the sixth embodiment is the optimal embodiment. By mass percent, in the sixth embodiment, the core of the single-mode optical fiber has a fluorine dopant content of 0.3% and a fluorine content of 0.1%; and the first fluorine-doped inner cladding has a fluorine concentration of 1.55%, and the second fluorine-doped inner cladding has a fluorine concentration of 4.09%. The radius R1 of the core of the single-mode optical fiber is 4 μm, the radius R2 of the first fluorine-doped inner cladding is 30 μm, and the radius R3 of the second fluorine-doped inner cladding is 46 μm; and the maximum relative refractive index difference $\Delta 1_{max}$ between the core and the first fluorine-doped inner cladding is 0.30%, the maximum relative refractive index difference $\Delta2_{max}$ between the first fluorine-doped inner cladding and the second fluorine-doped inner cladding is −0.61%, and the maximum relative refractive index difference $\Delta3_{max}$ between the second fluorine-doped inner cladding and the outer cladding 4 is −0.91%.

The single-mode optical fiber has a bending loss of 0.11 dB at the wavelength of 1550 nm and a bending loss of 0.21 dB at the wavelength of 1625 nm when wound by one circle under the bending diameter of 10 mm; and the single-mode optical fiber has an attenuation coefficient of 0.322 dB/km at the wavelength of 1310 nm, an attenuation coefficient of 0.185 dB/km at the wavelength of 1550 nm and an attenuation coefficient of 0.186 dB/km at the wavelength of 1625 nm.

The calculation formula involved in the present invention is as follows:
The relative refractive index difference:

$$\Delta\% = \left[\frac{n_i^2 - n_0^2}{2 * n_i^2}\right] \times 100\% \approx \frac{n_i - n_0}{n_0} \times 100\%$$

Wherein, $n_i$ is the refractive index of the core or the claddings at the wavelength of 1300 nm, and $n_0$ is the refractive index of the adjacent outer cladding at the wavelength of 1300 nm.

Various modifications and transformations of the embodiments of the present invention can be made by those skilled in the field, and if these modifications and transformations are within the scope of the claims of the present invention and equivalent techniques, these modifications and transformations are also within the protection scope of the present invention.

The content, not illustrated in detail, in the description belongs to the prior art known to those skilled in the field.

What is claimed is:

1. A bending-insensitive, radiation-resistant single-mode optical fiber, sequentially comprising, from inside to outside,
    a core,
    inner claddings, and
    an outer cladding;
    wherein the core, the inner claddings and the outer cladding are all made from a quartz material; wherein the inner claddings comprise, from inside to outside,
    a first fluorine-doped inner cladding, and
    a second fluorine-doped inner cladding;
    the core and the first fluorine-doped inner cladding are not doped with germanium, and a first concentration of other metal impurities and a second concentration of phosphorus are less than 0.1 ppm: by mass percent, the core has a fluorine dopant content of 0-0.45% and a chlorine content of 0.01-0.10%; the first fluorine-doped inner cladding has a fluorine concentration of 1.00-1.55%; and the second fluorine-doped inner cladding has a fluorine concentration of 3.03-5.00%;
    wherein a first maximum relative refractive index difference $\Delta1_{max}$ between the core and the first fluorine-doped inner cladding is 0.30%, a second maximum relative refractive index difference $\Delta2_{max}$ between the first fluorine-doped inner cladding and the second fluorine-doped inner cladding is 0.61%, and a third maximum relative refractive index difference $\Delta3_{max}$ between the second fluorine-doped inner cladding and the outer cladding is −0.91%.

2. The bending-insensitive, radiation-resistant single-mode optical fiber according to claim 1, wherein the single-mode optical fiber has an attenuation coefficient of 0.322 dB/km at a wavelength of 1310 nm, an attenuation coefficient of 0.185 dB/km at a wavelength of 1550 nm and an attenuation coefficient of 0.186 dB/km at a wavelength of 1625 nm.

3. The bending-insensitive, radiation-resistant single-mode optical fiber according to claim 1, wherein the single-mode optical fiber has a bending loss of 0.11 dB at a wavelength of 1550 nm and a bending loss of 0.21 dB at a wavelength of 1625 nm when wound by one circle under a bending diameter of 10 mm.

4. The bending-insensitive, radiation-resistant single-mode optical fiber according to claim 1, wherein a first radius R1 of the core is 3.9-4.3 μm, a second radius R2 of the first fluorine-doped inner cladding is 5-34 μm, and a third radius R3 of the second fluorine-doped inner cladding is 22-48 μm.

5. The bending-insensitive, radiation-resistant single-mode optical fiber according to claim 4, wherein the first radius R1 of the core is 4 μm, the second radius R2 of the first fluorine-doped inner cladding is 30 μm, and the third radius R3 of the second fluorine-doped inner cladding is 46 μm.

6. The bending-insensitive, radiation-resistant single-mode optical fiber according to claim 1, wherein under a gamma radiation dose of 2000 kGy, the single-mode optical fiber has a radiation additional loss below 14.8 dB/km at a wavelength of 1310 nm.

7. The bending-insensitive, radiation-resistant single-mode optical fiber according to claim 1, wherein the single-mode optical fiber is clad with an optical fiber coating prepared from one or two of high-temperature resistant acrylic resin, silicone rubber, polyimide, carbon and metal.

8. A bending-insensitive, radiation-resistant single-mode optical fiber, sequentially comprising, from inside to outside,
    a core,
    inner claddings, and
    an outer cladding;
    wherein the core, the inner claddings and the outer cladding are all made from a quartz material; wherein the inner claddings comprise, from inside to outside,
    a first fluorine-doped inner cladding, and
    a second fluorine-doped inner cladding;
    the core and the first fluorine-doped inner cladding are not doped with germanium, and a first concentration of other metal impurities and a second concentration of phosphorus are less than 0.1 ppm: by mass percent, the core has a fluorine dopant content of 0-0.45% and a chlorine content of 0.01-0.10%; the first fluorine-doped inner cladding has a fluorine concentration of 1.00-1.55%; and the second fluorine-doped inner cladding has a fluorine concentration of 3.03-5.00%;
    wherein,
    a first maximum relative refractive index difference $\Delta1_{max}$ between the core and the first fluorine-doped inner cladding is 0.28%, a second maximum relative refractive index difference $\Delta2_{max}$ between the first fluorine-doped inner cladding and the second fluorine-doped inner cladding is 0.7%, and a third maximum relative refractive index difference $\Delta3_{max}$ between the second fluorine-doped inner cladding and the outer cladding is −0.28%; or
    a first maximum relative refractive index difference $\Delta1_{max}$ between the core and the first fluorine-doped inner cladding is 0.28%, a second maximum relative refractive index difference $\Delta 2_{max}$ between the first fluorine-doped inner cladding and the second fluorine-doped inner cladding is 0.4%, and a third maximum relative refractive index difference $\Delta 3_{max}$ between the second fluorine-doped inner cladding and the outer cladding is −0.28%; or a first maximum relative refractive index difference $\Delta 1_{max}$ between the core and the first fluorine-doped inner cladding is 0.28%, a second maximum relative refractive index difference $\Delta 2_{max}$ between the first fluorine-doped inner cladding and the second fluorine-doped inner cladding is 0.5%, and a third maximum relative refractive index difference $\Delta 3_{max}$ between the second fluorine-doped inner cladding and the outer cladding is −0.28%; or a first maximum relative refractive index difference $\Delta 1_{max}$ between the core and the first fluorine-doped inner cladding is 0.28%, a second maximum relative refractive index difference $\Delta 2_{max}$ between the first fluorine-doped inner cladding and the second fluorine-doped inner cladding is 0.5%, and a third maximum relative refractive index difference $\Delta 3_{max}$ between the second fluorine-doped inner cladding and the outer cladding is −0.78%; or a first maximum relative refractive index difference $\Delta 1_{max}$ between the core and the first fluorine-doped inner cladding is 0.133%, a second maximum relative refractive index difference $\Delta 2_{max}$ between the first fluorine-doped inner cladding and the second fluorine-doped inner cladding is 0.96%, a the third maximum relative refractive index difference $\Delta 3_{max}$ between the second fluorine-doped inner cladding and the outer cladding is −1.093%.

9. The bending-insensitive, radiation-resistant single-mode optical fiber according to claim 8, wherein the single-mode optical fiber has an attenuation coefficient of 0.322 dB/km at a wavelength of 1310 nm, an attenuation coefficient of 0.185 dB/km at a wavelength of 1550 nm and an attenuation coefficient of 0.186 dB/km at a wavelength of 1625 nm.

10. The bending-insensitive, radiation-resistant single-mode optical fiber according to claim 8, wherein the single-mode optical fiber has a bending loss of 0.11 dB at a wavelength of 1550 nm and a bending loss of 0.21 dB at a wavelength of 1625 nm when wound by one circle under a bending diameter of 10 mm.

11. The bending-insensitive, radiation-resistant single-mode optical fiber according to claim 8, wherein a first radius R1 of the core is 3.9-4.3 μm, a second radius R2 of the first fluorine-doped inner cladding is 5-34 μm, and a third radius R3 of the second fluorine-doped inner cladding is 22-48 μm.

12. The bending-insensitive, radiation-resistant single-mode optical fiber according to claim 11, wherein the first radius R1 of the core is 4 μm, the second radius R2 of the first fluorine-doped inner cladding is 30 μm, and the third radius R3 of the second fluorine-doped inner cladding is 46 μm.

13. The bending-insensitive, radiation-resistant single-mode optical fiber according to claim 8, wherein under a gamma radiation dose of 2000 kGy, the single-mode optical fiber has a radiation additional loss below 14.8 dB/km at a wavelength of 1310 nm.

14. The bending-insensitive, radiation-resistant single-mode optical fiber according to claim 8, wherein the single-mode optical fiber is clad with an optical fiber coating prepared from one or two of high-temperature resistant acrylic resin, silicone rubber, polyimide, carbon and metal.

* * * * *